(12) United States Patent
Koilpillai et al.

(10) Patent No.: US 6,678,508 B1
(45) Date of Patent: Jan. 13, 2004

(54) POWER CONSERVATION METHOD FOR MOBILE COMMUNICATIONS DEVICE WITH TWO RECEIVERS

(75) Inventors: Ravinder David Koilpillai, Apex, NC (US); David R. Irvin, Raleigh, NC (US)

(73) Assignee: Ericsson Inc., Research Triangle Park, NC (US)

( * ) Notice: Subject to any disclaimer, the term of this patent is extended or adjusted under 35 U.S.C. 154(b) by 0 days.

(21) Appl. No.: 09/499,848

(22) Filed: Feb. 7, 2000

(51) Int. Cl.$^7$ ............................................... H04B 17/02
(52) U.S. Cl. ..................... 455/137; 455/132; 455/133; 455/273; 375/347
(58) Field of Search .................... 455/574, 343, 455/133, 134, 135, 137, 132, 138, 139, 272, 273, 275, 276.1; 375/347

(56) References Cited

U.S. PATENT DOCUMENTS

| | | | |
|---|---|---|---|
| 4,769,825 A | | 9/1988 | Vogel |
| 5,224,152 A | | 6/1993 | Harte ........................... 379/59 |
| 5,280,637 A | * | 1/1994 | Larosa et al. |
| 5,566,364 A | * | 10/1996 | Mizoguchi et al. |
| 5,568,513 A | | 10/1996 | Croft et al. .................. 375/224 |
| 5,680,419 A | | 10/1997 | Bottomley .................. 375/347 |
| 5,757,866 A | * | 5/1998 | Kannari et al. |
| 6,009,310 A | | 12/1999 | Motohashi |
| 6,148,218 A | * | 11/2000 | Solondz |

FOREIGN PATENT DOCUMENTS

| | | |
|---|---|---|
| EP | 0 500 326 a2 | 8/1992 |
| JP | 02271724 | 6/1990 |

* cited by examiner

*Primary Examiner*—Sinh Tran
*Assistant Examiner*—Huy D Nguyen
(74) *Attorney, Agent, or Firm*—Coats & Bennett, P.L.L.C.

(57) ABSTRACT

A mobile communications device includes at least two receivers and a memory module. The power consumption of the mobile communications device is controlled by selectively awakening and sleeping the receivers as needed to ensure that the desired quality of reception to check the control channel for messages from an associated base station and to handle incoming communications is maintained. The mobile communications device may operate in single receiver mode or dual receiver diversity mode. In the dual receiver diversity mode, the mobile communications device may switch between one of a number of diversity combining techniques based on the quality of reception.

41 Claims, 7 Drawing Sheets

POWER CONSERVATION METHOD FOR MOBILE COMMUNICATIONS DEVICE WITH TWO RECEIVERS

BACKGROUND OF THE INVENTION

The present invention relates to mobile communications devices for use in analog and digital-based cellular communication systems, and, in particular, to a method for conserving power in such mobile communications devices using two receivers for improved diversity reception.

Mobile communications devices or terminals are becoming ubiquitous in modem society. Typical mobile communications devices include pagers, personal digital assistants, mobile phones, and the like, however, all such devices shall be referred to herein as mobile terminals. One of the primary concerns of consumers is directed to the size and weight of the mobile terminals. Many people carry two or more mobile communications devices, such as a pager and mobile phone. If they have to carry a mobile terminal, they want it to be as small and unobtrusive as possible. As a result, there is increasing pressure to shrink the mobile terminal and its internal components.

A second concern exists about the battery capacity of the mobile terminals, and especially the operating time that the battery provides before needing to be recharged. However, this concern is directly at odds with the desire to miniaturize the mobile terminals. Batteries power the myriad of functions available on the mobile terminal and are critical to their operation. While advances have been made in the size and weight of the battery, pressures to make the mobile terminals smaller and lighter have frequently exceeded the ability of the battery designers to produce a battery which supplies the needed power for the desired long interval between recharging while fitting within the condensed mobile terminal.

Therefore, it has become increasingly imperative that the manufacturers of the mobile terminals improve on ways to conserve energy within the mobile terminals. One method to conserve battery power is to put the mobile terminal into a "sleep" mode. During sleep mode, the mobile terminal is effectively on standby mode waiting for incoming communication. During a sleep period, the receiver in the mobile terminal is not powered so that there is less drain on the battery. A low-power timer in the mobile terminal periodically "wakes up" the receiver to process the control channel from the associated base station to determine if there are any incoming messages for the mobile terminal. If not, then the mobile terminal returns to sleep mode. If so, then the mobile terminal remains awake and processes the incoming message according to the instructions of the control channel from the associated base station.

Sleep mode is different from merely powering a mobile terminal off in that sleep mode presupposes waking up periodically to check the control channel. In contrast, turning off may allow for repowering, but it does not presuppose returning to an active state periodically to check the control channel. Two examples of sleeping techniques are seen in U.S. Pat. Nos. 5,224,152 and 5,568,513, which are incorporated by reference.

A third concern is quality of reception. A common problem that occurs in the radio transmission of signals is that the signals are sometimes lost or distorted as a result of multipath fading and interference. One known method of reducing interference and multipath fading is to use a plurality of antennas, and more preferably a plurality of receivers. That is, the mobile terminal includes two receiver circuits, which are then utilized together using interference cancellation or other known performance-enhancing techniques to provide a clear audio signal for the user in the case of a voice call and improved data throughput in the case of a data call. This two receiver methodology is also in direct conflict with both size reduction and battery conservation. The additional circuitry adds a drain on the battery, thereby increasing the frequency of recharging.

With the above concerns in mind, there exists a need in the mobile communications industry to provide a mobile communications device which has the benefits of improved power conservation and the two receiver diversity.

SUMMARY OF THE INVENTION

The present invention meets this need by providing a mobile communications device with at least two receivers and a memory. The power consumption of the mobile communications device is controlled by selectively awakening and sleeping the receivers as needed to ensure the desired quality of reception to check the control channel for messages from an associated base station and to handle incoming communications. A plurality of diversity combining techniques are used to improve the performance of the receivers in the mobile communications device. The performance of the receivers is evaluated using the Carrier-to-Interference ratio (C/I), Bit-Error-Ratio (BER), Frame Erasure Rate (FER), Received Signal Strength Indicator (RSSI), soft information confidence, voice quality or a related performance measure or some combination of these performance measurements.

In the preferred embodiment, during periodic waking periods, the mobile communications device checks the individual receivers to see if they can provide adequate reception before relying on both receivers and one of the plurality of diversity combining techniques. The device increments through the diversity combining techniques in order of required power consumption until a desired quality of reception is achieved. Conversely, if reception is adequate, the device checks to see if a lower level of power consumption is possible during the periodic waking periods. This is accomplished by determining whether or not the diversity combining technique can be decremented or scaled back to a single receiver.

DETAILED DESCRIPTION OF THE INVENTION

While adaptable to a myriad of mobile communications devices or terminals such as pagers, personal digital assistants and the like, the present invention is particularly well suited for use in a cellular telephone.

Figure 1:
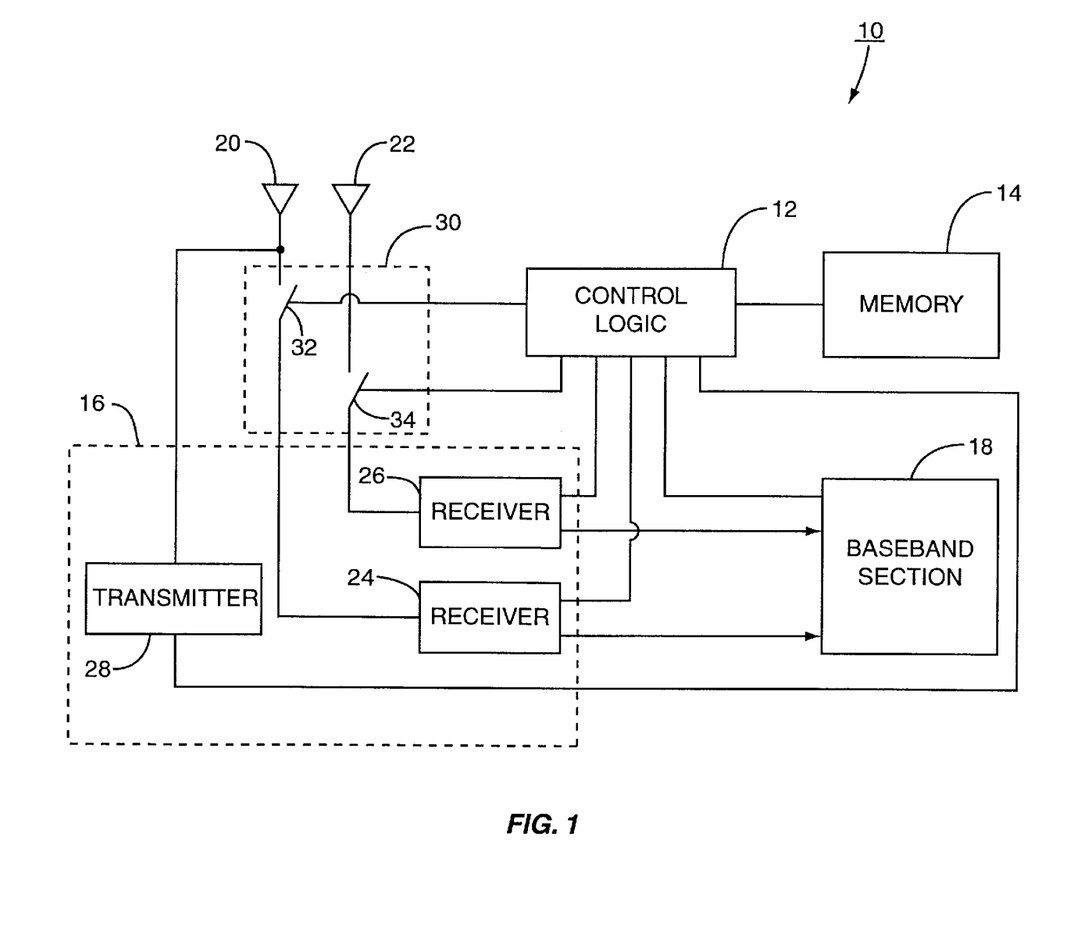
FIG. 1 is a block diagram of a mobile terminal according to the present invention.

FIG. 1 is a block diagram of a mobile terminal 10 made according to the present invention. Mobile terminal 10 includes control logic 12, memory 14, a transceiver section 16, a baseband processing section 18, a pair of diversity antennas 20, 22, and a switching unit 30. Control logic 12 controls the operation of the mobile terminal 10 according to program instructions stored in memory 14. Control logic 12 may comprise a single dedicated processor or, alternately, may comprise multiple processors, each performing different control functions. Memory 14 represents the hierarchy of memory normally present in a mobile terminal 10. Memory 14 stores the operating system programs and data used by the mobile terminal 10 to control operation of the mobile terminal 10. Memory 14 may also store application programs and user data.

Transceiver section 16 comprises a first receiver 24, a second receiver 26, and a transmitter 28. Receivers 24, 26 are connected to respective antennas 20, 22 via switching unit 30. The receivers 24, 26 can be operated independently of one another in a single receiver mode or, alternately, may be operated together in a dual receiver diversity mode. The receivers 24, 26 receive electromagnetic waves representative of a signal on a control channel via the antennas 20, 22. The receivers 24, 26 process the received electromagnetic waves and extract the signal in a conventional manner. In dual receiver diversity mode, the receivers 24, 26 process the received electromagnetic waves concurrently and extract the signal in a redundant manner such that the same signal is extracted separately by each receiver 24, 26. It will be appreciated by those skilled in the art that the signal may comprise any desired information, such as voice or data information. The transmitter 28 is operatively connected to antenna 20 and operates in a conventional manner.

The baseband section 18 is responsible for processing signals for transmission by the transmitter 28 and for processing signals received by receivers 24, 26. The baseband section 18 is also responsible for any diversity combining performed by the mobile terminal 10. In contrast to the prior art, the baseband section 18 is programmed to use a variety of diversity-combining techniques and may switch between different diversity techniques as needed to ensure an acceptable signal quality while consuming the least possible amount of power.

Switching unit 30 operatively connects receivers 24, 26 to antennas 20, 22, respectively. Switching unit 30 comprises a pair of switches 32, 34. Control logic 12 selectively actuates switches 32, 34, and receivers 24, 26 to select the desired operating mode as will be described in more detail below. In general, control logic 12 selects the operating mode that is the least power consumptive and ensures a minimum received quality standard.

There are presently several techniques by which two receivers can be combined to provide better reception. These are all loosely called diversity combining techniques, and include techniques such as Equal Gain Combining (EGC), Maximal Ratio Combining (MRC), Interference Rejection Combining (IRC) and the like. MRC involves more computations than EGC and is thus more power consumptive. IRC is a refinement of the MRC technique. While allowing better quality of reception, IRC is more power consumptive than MRC. A mobile terminal that uses IRC is described in U.S. Pat. No. 5,680,419, which is hereby incorporated by reference.

Presently, mobile terminals are only programmed to use one diversity combining technique and cannot switch between them as needed or desired to conserve power. In the present invention, the mobile terminal 10 is able to switch between single receiver mode and dual receiver diversity mode as needed. Further, in dual receiver diversity mode the mobile terminal 10 can choose between a variety of different diversity combining techniques depending on the quality of the received signal. The receivers 24, 26 are configured to measure the signal quality of the electromagnetic wave and generate respective signal quality indicators representative of the signal quality of the electromagnetic wave, and hence, the signal, received by each receiver 24, 26.

The particular operating mode selected by control logic 12 is based on signal quality measurements. Appropriate signal quality measurements include Carrier-to-Interference Ratio (C/I), Bit Error Ratio (BER), Frame Erasure Rate (FER), Received Signal Strength Indicator (RSSI), some other similar performance measure, or some combination of these factors. Based on some predetermined decision criteria, the control logic 12 selects either single receiver mode or dual receiver diversity mode. In essence, the mobile terminal 10 selects single receiver mode when the desired signal quality criteria can be met using either one of the receivers 24, 26. If neither receiver 24, 26 provides the desired signal quality, then dual receiver diversity mode is selected. In dual receiver diversity mode, the control logic 12 can select between a variety of different diversity-combining techniques. Initially, the mobile terminal 10 selects the diversity technique that is least consumptive from a power standpoint. During a call, the mobile terminal 10 continues to monitor the signal quality and can change operating modes, or change the diversity technique being used in order to minimize power consumption.

Figure 2:
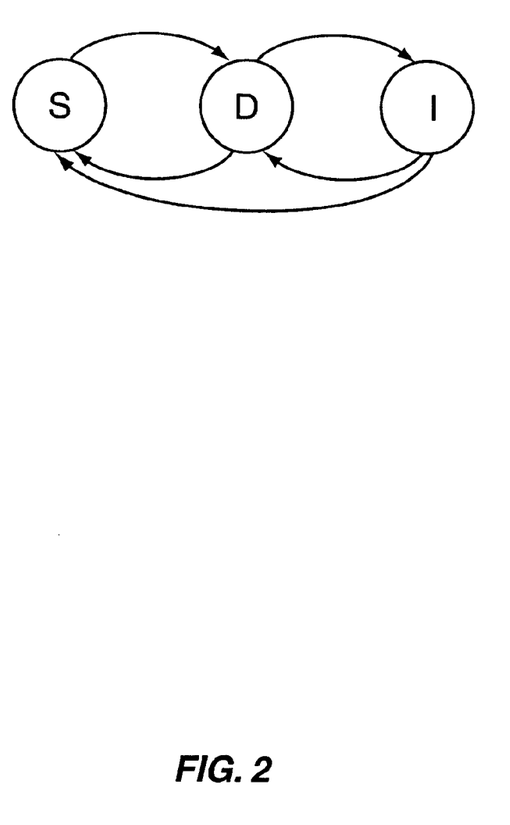
FIG. 2 is a state diagram illustrating the various operating modes of themobile terminal of FIG. 1.

The process of changing operating modes or diversity techniques is shown in the state diagram seen in FIG. 2. In FIG. 2, the circles represent the different operating modes. The least power consumptive mode, represented by reference character S, is the single receiver mode. The most consumptive mode which yields the best quality, respresented by reference character 1, is diversity combining mode using IRC. The intermediate state, represented by reference character D, is diversity combining mode using EGC or MRC.

In operation, the mobile terminal 10 goes into a sleep mode or standby mode when it is not actively involved in a call. In sleep mode, both receivers 24, 26 and transmitter 28 are powered off. The mobile terminal 10 periodically wakes up and monitors the control channel to determine if it is being paged or needs to perform some other task. When the mobile terminal 10 wakes, it turns on one or both receivers 24, 26 as described more fully below. Mobile terminal 10 initially selects the operating mode that was last used and begins to process the control channel. The mobile terminal 10 will then determine whether a different operating mode is required based on measurements of the received signal. In general, the mobile terminal 10 will move to a more power consumptive mode if the received signal quality is unsatisfactory and to a less consumptive mode if possible to conserve power provided that a predetermined minimum signal quality standards can be met. The majority of the time, the mobile terminal 10 will process the control channel and discover that there are no incoming calls or other tasks to perform and return to sleep mode. Occasionally, however, there will be an incoming call or some other task to perform. Mobile terminal 10 will receive the call using the operating mode that was required to process the control channel. At the end of the call, the mobile terminal 10 stores the last used settings and returns to sleep mode. In particular, a flag mode is set in memory 14 to indicate the mode last used by the mobile terminal (e.g., dual-receiver diversity vs. single receiver). Also, a primary receiver flag is set in memory 14 to indicate which of the receivers 24, 26 is designated as the primary receiver.

Figure 3:
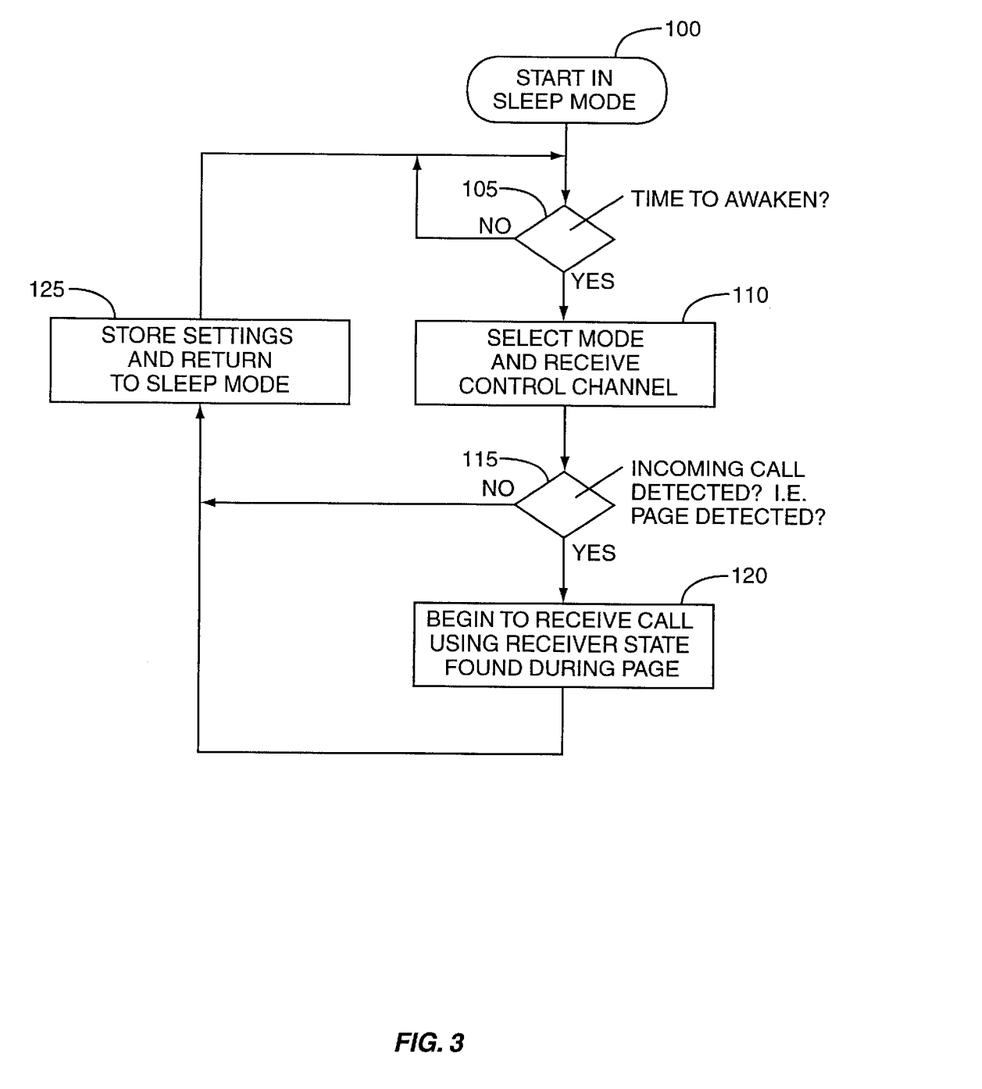
FIG. 3 is a flow chart illustrating the operation of the mobile terminal of FIG. 1.

FIG. 3 is a flow diagram illustrating the operation of the mobile terminal 10. It is assumed that the mobile terminal 10 is initially in sleep mode, i.e., meaning that both receivers 24, 26 are deactivated. While in sleep mode, mobile terminal 10 periodically checks to determine whether it is time to awaken (block 105). If not, the mobile terminal 10 remains in sleep mode. An internal timer may indicate that it is time to awaken. When it is time to awaken, mobile terminal 10 activates one or both receivers 24, 26 and receives the control channel. The initial operating mode will be the last used mode as indicated by the mode flag in memory 14. While receiving the control channel, the mobile terminal 10 will select an operating mode based on the received signal on the control channel (block 110). The possible operating modes include single receiver mode and dual receiver diversity modes.

In single receiver mode, the mobile terminal 10 can receive signals on either of its two receivers 24, 26. In dual receiver diversity mode, mobile terminal 10 preferably has a choice of two or more diversity-combining techniques, such as EGC, MRC, and IRC. The initial operating mode is either single receiver mode or dual receiver diversity mode, with the least power consumptive technique being preferred.

The majority of the time, the mobile terminal 10 will process the control channel, using the selected operating mode, discover that there are no incoming calls (block 115) or other tasks to perform, and return to sleep. In that case, the mobile terminal 10 stores the last used operating mode in memory and returns to sleep mode (block 125). The mobile terminal 10 also notes which of the receivers 24, 26 is designated as the primary receiver by setting the primary receiver flag. Occasionally, however, there will be an incoming call or some other task to perform, such as neighbor list scanning. If so, the mobile terminal 10 begins to receive the call (block 120) using the operating mode selected while the control channel was being received. At the end of the call, the mobile terminal 10 stores the last used settings and returns to sleep mode (block 125).

During a call, the mobile terminal 10 may continuously monitor received signal quality and determine whether a different operating mode is required based on measurements of the received signal. In general, if the mobile terminal 10 determines that the signal quality is unsatisfactory, the mobile terminal 10 may move to a more power consumptive operating mode. If the mobile terminal 10 determines that the received signal quality is satisfactory and a less consumptive mode is possible to conserve power, the mobile terminal 10 may switch to a less consumptive operating mode, provided that a predetermined minimum signal quality standards can be met in the new mode.

Figure 4:
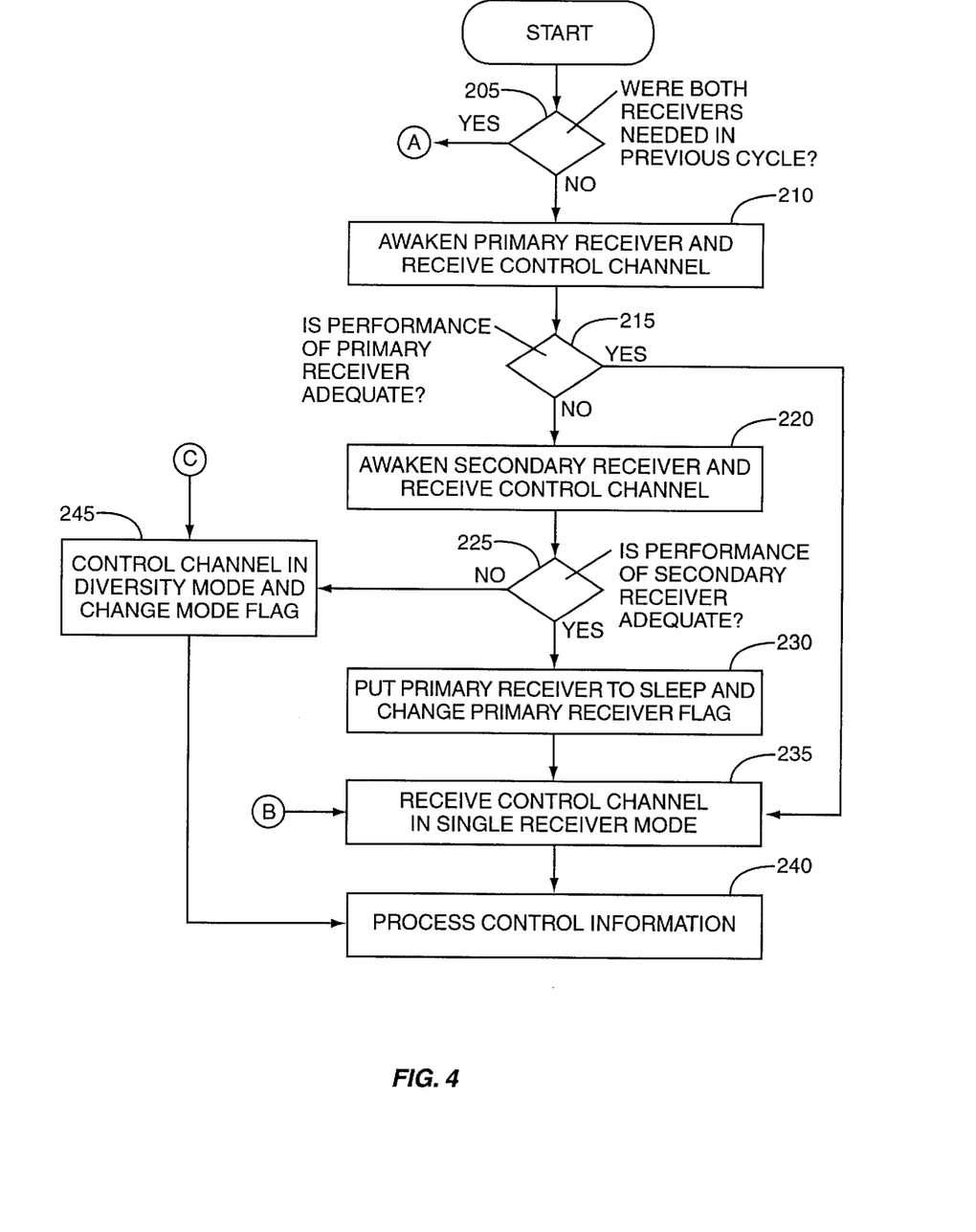
FIGS. 4 and 5 are a flow chart illustrating the procedure for selecting an operating mode for the mobile terminal of FIG. 1.
Figure 5:
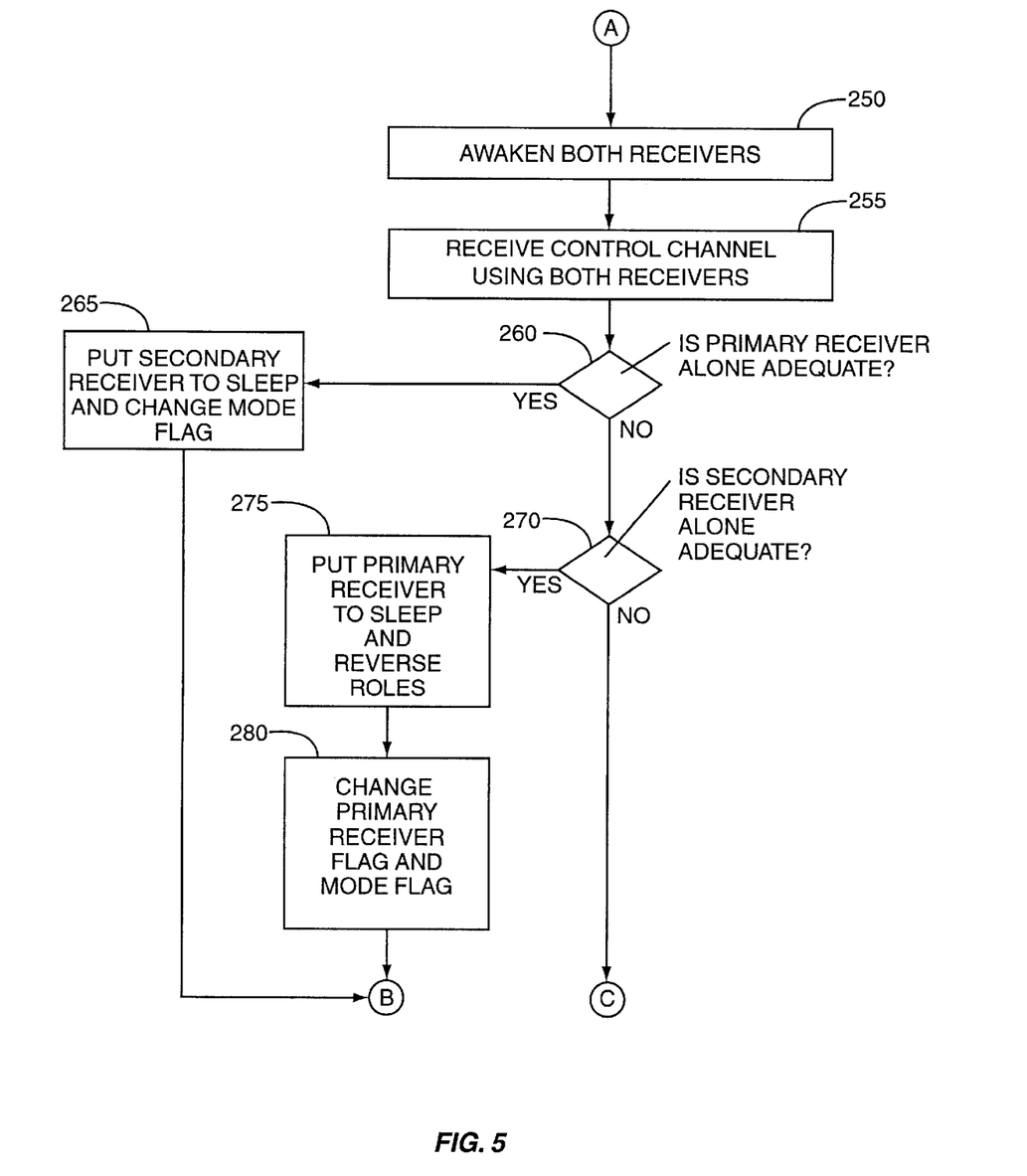

FIGS. 4 and 5 illustrate an exemplary procedure for selecting the operating mode. The procedure shown in FIGS. 4 and 5 correspond to block 110 in FIG. 3. When the mobile terminal 10 awakens, the mobile terminal 10 checks the mode flag in memory 14 to see if both receivers 24, 26 were needed in the previous awake cycle (block 205). As a default, when the mobile terminal 10 is powered up the first time, the mode flag is set to indicate single receiver mode and the first receiver 24 is set as the primary receiver. Where only one receiver was used in the last awake cycle, the mobile terminal 10 awakens the primary receiver and receives the control channel (block 210). The primary receiver may be either the first receiver 24 or the second receiver 26 as indicated by the primary receiver flag in memory 14. While receiving the control channel, the mobile terminal 10 checks to see if the performance of the primary receiver alone is adequate to ensure the desired quality of reception (block 215). If performance is acceptable, the mobile terminal 10 remains in single receiver mode with the primary receiver used to receive the control channel (block 235). The control information is processed conventionally in single receiver mode (block 240). The secondary receiver, which likewise may be either the first receiver 24 or the second receiver 26, is left in sleep mode, i.e., turned off.

If the signal quality for the currently designated primary receiver is inadequate (block 215), the mobile terminal 10 awakens (i.e. turns on) the secondary receiver and receives the control channel with both receivers (block 220). While receiving the control channel, the mobile terminal 10 determines if the performance of the secondary receiver alone is adequate to provide the desired quality of reception (block 225). If the secondary receiver can provide the desired signal quality, the mobile terminal 10 deactivates the primary receiver and the former secondary receiver is designated as the new primary receiver (block 230). The original primary receiver (now asleep) is designated as the secondary receiver. The primary receiver flag is set in memory 14 to indicate this reversal of designation. After switching the designations, the control channel is received with the new primary receiver (block 235) and the control channel is processed conventionally for mobile terminals with one receiver (block 240). If the secondary receiver cannot by itself provide the desired signal quality, the mobile terminal 10 receives the control channel with both receivers and switches to dual receiver diversity mode (block 245). The received signals are then processed (block 240) using diversity combining techniques.

Turning now to FIG. 5, if the last used mode when the mobile terminal awakens is dual receiver diversity mode, the mobile terminal 10 initially awakens both receivers (block 250), and receives the control channel on both receivers (block 255). While receiving the control channel on both receivers, the mobile terminal 10 determines whether either of the receivers 24, 26 alone is adequate (blocks 260, 270). Preferably, the mobile terminal 10 checks the primary receiver first (block 260). If the primary receiver alone is sufficient, the mobile terminal 10 deactivates the secondary receiver and changes the mode flag to note that dual receiver diversity mode is not needed (block 265). The control channel is then received conventionally using just the primary receiver and processed (blocks 235, 240 in FIG. 4).

If the primary receiver does not provide adequate signal quality, the mobile terminal 10 determines whether the secondary receiver alone is adequate (block 270). If not, the mobile terminal 10 continues to receive the call in diversity mode using both receivers 24, 26 (block 245, FIG. 4). In the preferred embodiment the control channel is processed using the MRC technique, however other diversity combining techniques such as IRC could be used.

If the secondary receiver is sufficient to provide the desired signal quality, the primary receiver is deactivated and the mobile terminal 10 changes the primary receiver flag in memory 14 (block 275). The original secondary receiver becomes the new primary receiver and the original primary receiver (now already asleep) becomes the new secondary receiver. The mobile terminal 10 sets the primary receiver flag so that the appropriate receiver 24 or 26 is designated the primary receiver. The mobile terminal 10 also changes the mode flag to note that both receivers are not needed. The mobile terminal 10 then receives the control channel with the new primary receiver conventionally (block 235, FIG. 4) and processes the control channel in single receiver mode (block 240, FIG. 4).

Figure 6:
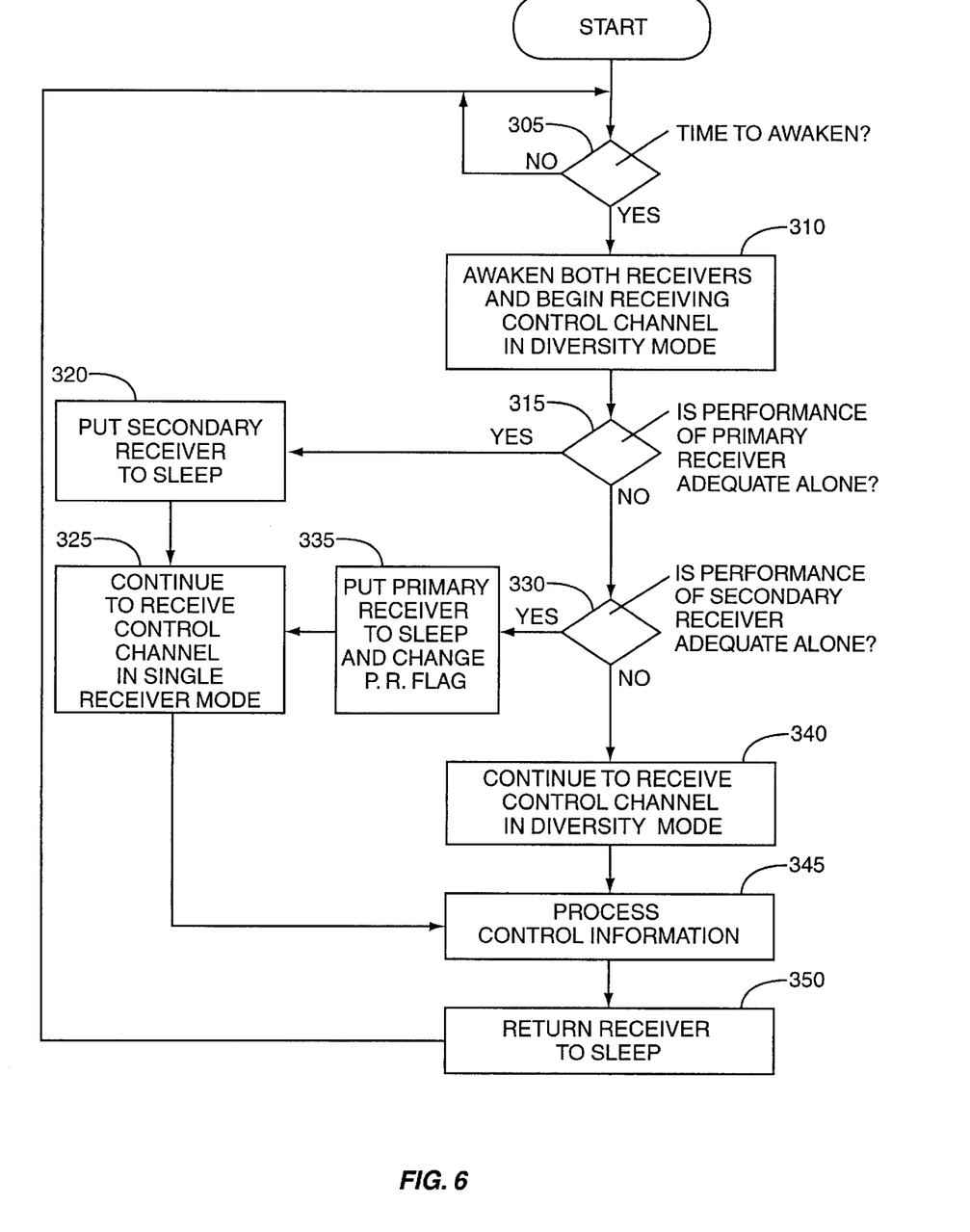
FIG. 6 is a flow chart of an alternate procedure for selecting an operating mode for the mobile terminal of FIG. 1.

A second implementation of the present invention is seen in FIG. 6. In contrast to the method of FIGS. 4 and 5, where the mobile terminal 10 wakens the receiver(s) last needed, the second implementation routinely wakes up both receivers and deactivates one if possible. This improves the likelihood that the control channel is successfully processed, but at the expense of greater initial power consumption. Specifically, the mobile terminal 10 determines whether it is time to awaken (block 305). If not, then the mobile terminal checks periodically until it is time to awaken. This may be accomplished through the use of an internal timer. When it is time to awaken, the mobile terminal 10 activates both receivers and begins receiving the control channel (block 310) using one of the diversity combining techniques discussed earlier. While the mobile terminal 10 is receiving with both receivers, the mobile terminal 10 is simultaneously testing to see if one receiver alone is adequate. Specifically, the mobile terminal 10 first checks whether the primary receiver alone is adequate (block 315). If so, the mobile terminal 10 deactivates the secondary receiver and changes the mode flag (block 320). The mobile terminal 10 then receives the control channel with just the primary receiver (block 325). The control information is processed conventionally (block 345) and the mobile terminal 10 returns to sleep (block 350) after completion of the processing.

If the primary receiver is inadequate by itself, the mobile terminal 10 determines whether the performance of the secondary receiver alone is adequate (block 330). If so, the mobile terminal 10 puts the primary receiver to sleep (block 335). The mobile terminal 10 then reverses the designations of the primary receiver and the secondary receiver and sets the primary receiver flag to indicate which receiver is the primary receiver. The new primary receiver continues to receive the control channel (block 325) and processes the information conventionally (block 345). After completion of the processing, the mobile terminal 10 returns to sleep (block 350) to restart the process.

If neither receiver 24, 26 itself is adequate, the mobile terminal 10 continues to receive the control channel with both receivers in dual receiver diversity mode (block 340). After the control channel is processed (block 345), the mobile terminal 10 returns to sleep mode (block 350).

Figure 7:
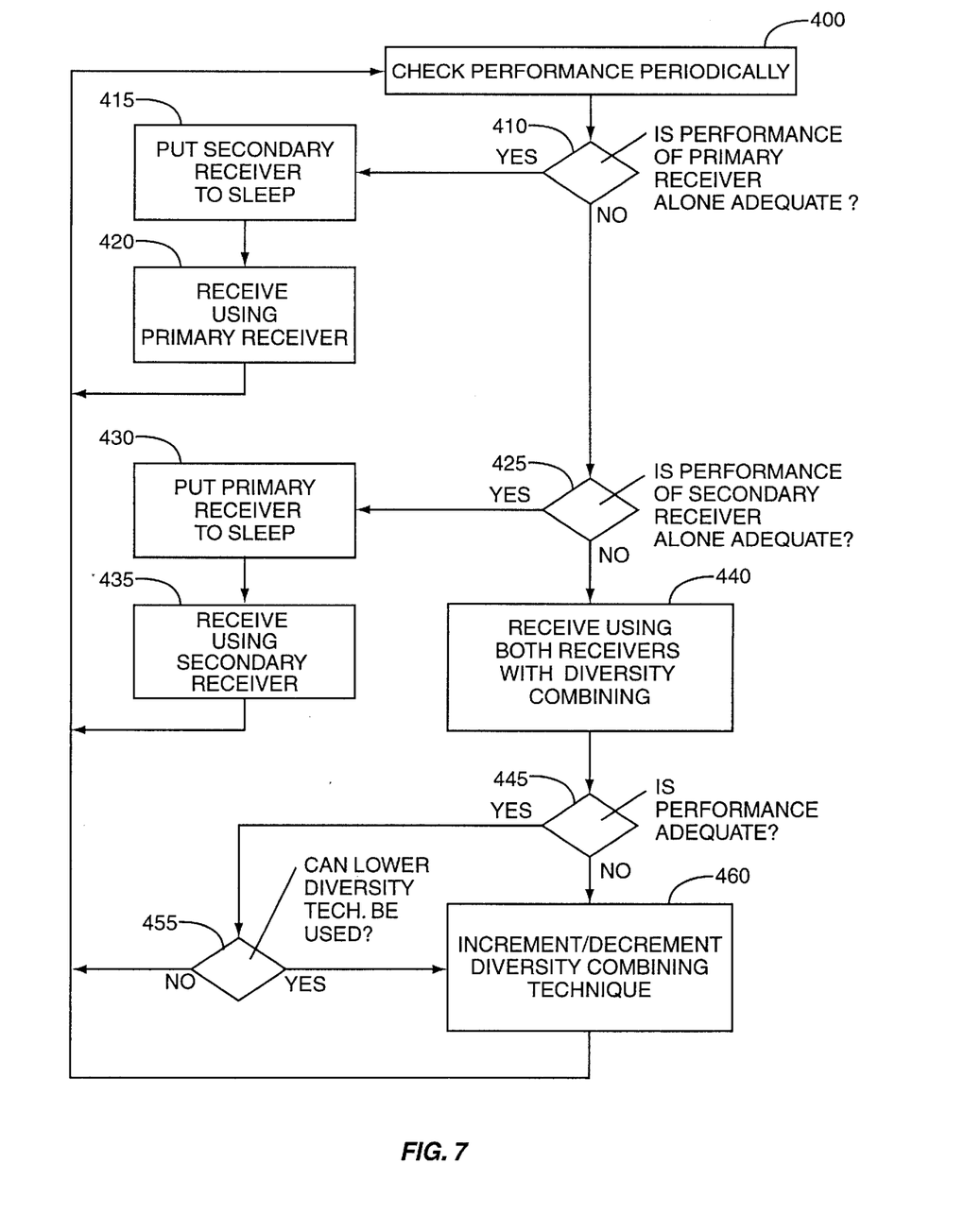
FIG. 7 is a flow chart illustrating a procedure for monitoring the performance of the mobile terminal of FIG. 1 during the course of a call and changing operating modes.

As already noted, when a call is received the mobile terminal 10 may continue to monitor performance of both receivers 24, 26 while it is receiving the call. In particular, while operating in dual receiver diversity mode, the mobile terminal 10 continuously monitors the received signal to determine if single receiver mode is acceptable. If so, the mobile terminal 10 switches from dual receiver diversity mode to single receiver mode. This monitoring procedure is illustrated in FIG. 7. The mobile terminal 10 is assumed to be receiving in dual receiver diversity mode initially (block 400). Performance of the primary and secondary receivers is periodically checked (blocks 410, 425). Initially, the performance of the primary receiver alone is checked to see if the primary receiver alone is adequate (block 410). If so, then the secondary receiver is put to sleep mode (block 415) and reception continues using just the primary receiver (block 420). If not, the performance of the secondary receiver is checked to see if it is adequate (block 425). If so, then the primary receiver is put to sleep (block 430) and reception continues on the secondary receiver (block 435). As described above, the designations are reversed and reception continues until sleep mode is entered again. If neither receiver 24, 26 is sufficient, reception continues using a simple diversity combining technique such as MRC or EGC (block 440). However, in contrast to the previously described systems, the performance of the two-receiver reception is evaluated (block 445). If the performance is adequate, then the process recycles and continues to try to sleep one receiver to conserve power as described above on the hope that the reception improves. However, if performance is not adequate, then the control function increments to a more power consumptive diversity technique such as interference rejection combining (IRC) (block 460) to process the incoming signal. The switch to IRC is a last resort activity to improve performance because IRC technique involves increased computational calculations resulting in faster battery drain. If performance is adequate, the mobile terminal 10 may also determine whether a less power consumptive diversity technique can be used (block 455). If so, the mobile terminal 10 decrements the diversity technique (block 455).

The process described above repeats continuously while looking for an opportunity to decrement to a lower power consuming technique, either by deactivating one of the receivers or reverting back to EGC or MRC. Furthermore, it is believed that EGC consumes less power than MRC, although at the expense of being less adaptable to changing path interference, resulting in a less robust performance. Thus, it is within the scope of the present invention to initially use EGC as the diversity combining technique, and upon discovery that the performance is inadequate, increment the processing technique to MRC. If MRC was determined to be inadequate, then IRC is implemented.

The present invention may, of course, be carried out in other specific ways than those herein set forth without departing from the spirit and essential characteristics of the invention. The present embodiments are, therefore, to be considered in all respects as illustrative and not restrictive, and all changes coming within the meaning and equivalency range of the appended claims are intended to be embraced therein.

What is claimed is:

1. A method of using a mobile communications device having first and second receivers, said method comprising:
   placing said first and second receivers in a sleep mode;
   waking the first receiver;
   receiving an electromagnetic wave representative of a signal on a control channel with said first receiver;
   measuring the signal quality of said electromagnetic wave received by the first receiver and determining a first signal quality indicator; and
   waking the second receiver and receiving the electromagnetic wave on the control channel with the second receiver if the first signal quality indicator of the electromagnetic wave received by said first receiver fails to meet predetermined signal quality criterion.

2. The method of claim 1 further including measuring the signal quality of the electromagnetic wave received by said second receiver and determining a second signal quality indicator, and placing the first receiver in said sleep mode if the second signal quality indicator of the electromagnetic wave received by the second receiver satisfies said predetermined signal quality criterion.

3. The method of claim 1 further including measuring the signal quality of the electromagnetic wave received by said second receiver and determining a second signal quality indicator, and receiving the electromagnetic wave on the control channel using both said first and second receivers if the second signal quality indicator of the electromagnetic wave received by the second receiver does not satisfy said predetermined signal quality criterion.

4. The method of claim 3 further including combining the signal corresponding to the electromagnetic wave received by said first receiver and the signal corresponding to the electromagnetic wave received by said second receiver using a diversity combining technique.

5. The method of claim 4 wherein said diversity combining technique comprises Equal Gain Combining.

6. The method of claim 4 wherein said diversity combining technique comprises Maximal Ratio Combining.

7. The method of claim 4 wherein said diversity combining technique comprises Interference Rejection Combining.

8. The method of claim 4 wherein combining the signal corresponding to the electromagnetic wave received by said first receiver and the signal corresponding to the electromagnetic wave received by said second receiver using a diversity combining technique comprises using a plurality of diversity combining techniques when said first signal quality indicator and said second signal quality indicator fail to meet said predetermined signal quality criterion.

9. The method of claim 4 further including using a plurality of diversity combining techniques to reduce power consumption when the at least one of the first and second quality indicators at least meets said predetermined signal quality criterion.

10. The method of claim 1 wherein said signal includes control information, and further including returning said first and second receivers to said sleep mode after receiving said control information.

11. A method for operating a mobile communications device having first and second receivers, wherein said mobile communication device has at least two operating modes, a single receiver operating mode and a dual receiver diversity operating mode, said method comprising:

deactivating said first and second receivers when the mobile communication device is in a sleep mode;

storing a last used operating mode from one of said at least two operating modes in said mobile communication device before entering said sleep mode;

periodically activating said mobile communication device to receive an electromagnetic wave representative of a signal on a control channel, wherein said last used operating mode is selected as an initial operating mode;

receiving said electromagnetic wave by said mobile communication device;

measuring the signal quality of said control channel and determining a signal quality indicator; and changing said initial operating mode to a second operating mode based upon the signal quality indicator.

12. The method of claim 11 wherein said initial operating mode is changed from said single receiver mode to said dual receiver diversity mode if the signal quality indicator does not satisfy predetermined signal quality criterion.

13. The method of claim 12 wherein said initial operating mode is changed from said dual receiver diversity mode to said single receiver mode if the signal quality indicator satisfies said predetermined signal quality criterion.

14. The method of claim 11 wherein one of said first and second receivers is designated as a primary receiver and the other of said first and second receivers is designated as a secondary receiver.

15. The method of claim 14 wherein the primary receiver is activated when said single receiver mode is selected.

16. The method of claim 15 wherein the secondary receiver is activated when said signal quality indicator of the electromagnetic wave received by the primary receiver fails to meet predetermined signal quality criterion.

17. The method of claim 15 wherein the primary receiver is deactivated when said signal quality indicator of the electromagnetic wave received by the secondary receiver satisfies said predetermined signal quality standards.

18. The method of claim 17 further including changing the designations of the primary and secondary receivers.

19. The method of claim 11 further comprising returning said first and second receivers to said sleep mode after processing control information received on said control channel.

20. A method of conserving power in a mobile communications device having a primary receiver and a secondary receiver, said method comprising:

waking both said primary and secondary receivers;

operating said mobile communications device in a dual receiver diversity mode to receive an electromagnetic wave having a control channel using both said primary and secondary receivers;

deactivating one of said primary and secondary receivers and operating in a single receiver mode if a first signal quality indicator representative of a signal quality of said control channel of said electromagnetic wave received by the other of said primary and secondary receivers meets predetermined signal quality standards;

processing the control channel; and returning said mobile communications device to a sleep mode after processing the control channel is completed.

21. The method of claim 20 further comprising receiving the control channel with both of said primary and secondary receivers and operating in said dual receiver diversity mode if said first signal quality indicator representative of said control channel of said electromagnetic wave received by the other of said primary and secondary receivers and a second signal quality indicator of said control channel of said electromagnetic wave received by said one of said primary and secondary receivers do not meet said predetermined signal quality standards.

22. The method of claim 21 further comprising combining said control channel corresponding to said electromagnetic wave received by said first receiver and said control channel corresponding to said electromagnetic wave received by said second receiver using a diversity combining technique.

23. The method of claim 22 wherein said diversity combining technique comprises Equal Gain Combining.

24. The method of claim 22 wherein said diversity combining technique comprises Maximal Ratio Combining.

25. The method of claim 22 wherein said diversity combining technique comprises Interference Rejection Combining.

26. The method of claim 22 wherein combining said control channel corresponding to said electromagnetic wave received by said first receiver and said control channel corresponding to said electromagnetic wave received by said second receiver using a diversity combining technique comprises using a plurality of diversity combining techniques when said first signal quality indicator and said second signal quality indicator fail to meet said predetermined signal quality criterion.

27. The method of claim 20 further including changing the designations of said primary and secondary receivers.

28. A method of using a mobile communications device having first and second diversity receivers, said method comprising:

receiving a signal on a control channel with said first and said second receiver to create a first and second received signal;

combining said first and second received signals into a combined signal using a first one of a plurality of diversity combining techniques;

measuring quality of said combined signal; and switching to a second one of said plurality of diversity combining techniques if said quality of said combined signal falls below some predetermined criterion, said second one of said plurality of diversity combining techniques being more power consumptive than said first one of said plurality of diversity techniques.

29. The method of claim 28 further including:

combining said first and second received signals into a second combined signal using a different second one of said plurality of diversity combining techniques;

measuring quality of said second combined signal; and switching to said different second one of said plurality of diversity combining techniques if said quality of said second combined signal exceeds some predetermined criterion, said different second one of said plurality of diversity combining techniques being less power consumptive than said first one of said plurality of diversity techniques.

30. The method of claim 28 wherein switching to a second one of said plurality of diversity combining techniques comprises switching between diversity combining techniques selected from the group consisting of:

Equal Gain Combining, Maximal Ratio Combining, and Interference Rejection. Combining.

31. A mobile terminal comprising:

first and second receivers to receive a signal transmitted from a base station and to output a received signal;

a baseband section for measuring the quality of said signals output by said first and second receivers and for generating a parameter indicative of said quality of said received signals; and control logic to:

place said first and second receivers in a sleep mode;

periodically wake said first receiver and receive a signal on a control channel with said first receiver; and wake said second receiver and receive a signal on the control channel with the second receiver if the parameter indicative of the signal quality of the signal received by said first receiver fails to meet predetermined signal quality criterion.

32. The mobile terminal of claim 31 wherein said control logic sleeps said second receiver when said parameter of said received signal output by said first receiver meets a predetermined signal quality criterion.

33. The mobile terminal of claim 31 wherein said control logic sleeps said first receiver when said parameter of said received signal output by said second receiver meets a predetermined signal quality criterion.

34. The mobile terminal of claim 31 wherein said control logic awakens both said first and second receivers when said parameter of said received signal output by said first and second receivers falls below a predetermined signal quality criterion.

35. The mobile terminal of claim 34 wherein said baseband section combines said signals output by said first and second receivers.

36. The mobile terminal of claim 35 wherein said baseband section combines said signals using a Maximal Ratio Combining technique.

37. The mobile terminal of claim 35 wherein said baseband section combines said signals using an Equal Gain Combining technique.

38. The mobile terminal of claim 35 wherein said baseband section combines said signals using one of a plurality of combining techniques.

39. The mobile terminal of claim 38 wherein said control logic selects one of said plurality of combining techniques based on received signal quality such that the combining technique that is the least power consumptive while still providing an acceptable signal quality is used.

40. A mobile terminal comprising:

a first receiver;

a second receiver;

a baseband section adapted to create a combined signal from outputs of said first and said second receivers, said baseband section using one of a plurality of diversity combining techniques to process said combined signal such that a signal quality indicator is generated; and a control logic for selecting one of a plurality of said diversity combining techniques based on said signal quality indicator.

41. The mobile terminal of claim 40 wherein said plurality of diversity combining techniques are selected from the group consisting of: Equal Gain Combining, Maximal Ratio Combining, and Interference Rejection Combining.

* * * * *